United States Patent
Martin

[11] Patent Number: 6,148,087
[45] Date of Patent: Nov. 14, 2000

[54] HEARING AID HAVING TWO HEARING APPARATUSES WITH OPTICAL SIGNAL TRANSMISSION THEREBETWEEN

[75] Inventor: Raimund Martin, Eggolsheim, Germany

[73] Assignee: Siemens Augiologische Technik GmbH, Erlangen, Germany

[21] Appl. No.: 09/016,937

[22] Filed: Feb. 3, 1998

[30] Foreign Application Priority Data

Feb. 4, 1997 [DE] Germany ............................ 197 04 119

[51] Int. Cl.[7] .................................................. H04R 25/00
[52] U.S. Cl. ........................ 381/327; 381/23.1; 381/328; 381/315; 381/322; 381/381; 455/151.2
[58] Field of Search ..................................... 381/23.1, 312, 381/322, 323, 324, 326, 327, 328, 381, 314, 315, 320, 321, 370, 309, 311; 455/149, 151.2, 153.1, 153.2

[56] References Cited

U.S. PATENT DOCUMENTS

| 3,787,643 | 1/1974 | Nielsen ................................ 179/107 |
| 3,883,701 | 5/1975 | Delorenzo ............................. 179/107 |
| 4,633,498 | 12/1986 | Warnke et al. ....................... 381/23.1 |
| 4,773,095 | 9/1988 | Zwicker et al. . |
| 5,717,771 | 2/1998 | Sauer et al. . |
| 5,812,680 | 9/1998 | Glendon ................................. 381/69 |

FOREIGN PATENT DOCUMENTS

| 23 60 342 | 9/1975 | Germany . |
| 76 15 686 | 9/1976 | Germany . |
| 30 32 311 | 3/1981 | Germany . |
| 35 08 830 | 9/1986 | Germany . |
| 37 05 478 | 9/1988 | Germany . |
| 600 727 | 12/1977 | Switzerland . |

*Primary Examiner*—Curtis A. Kuntz
*Assistant Examiner*—Suhan Ni
*Attorney, Agent, or Firm*—Hill & Simpson

[57] ABSTRACT

For binaural hearing, a hearing aid worn at the head has two hearing apparatuses respectively allocated to the ears, with at least one of the hearing apparatuses having a transmitter and the other hearing apparatus having a receiver for an optical signal transmission from the transmitting hearing apparatus to the receiving hearing apparatus.

9 Claims, 1 Drawing Sheet

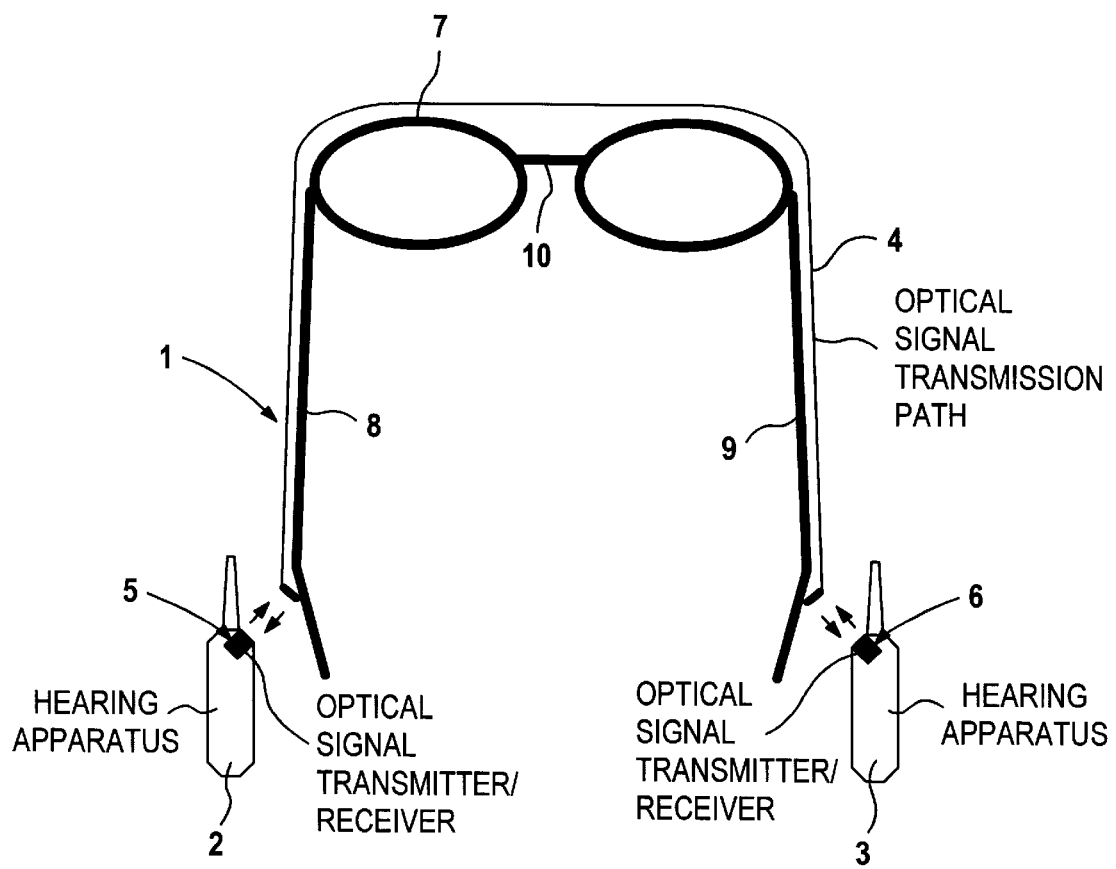

HEARING AID HAVING TWO HEARING APPARATUSES WITH OPTICAL SIGNAL TRANSMISSION THEREBETWEEN

BACKGROUND OF THE INVENTION

1. Field of the Invention

The present invention relates to a hearing aid of the type having two hearing aid apparatuses worn at the head, arranged in the region of the two ears in order to supply audio sound, with sound emitters being routed from the hearing aid apparatuses into the ear canals, and having a connection that transmits signals between the two hearing aid apparatuses.

2. Description of the Prior Art

The capacity to concentrate on a speaker in a loud environment and to suppress other sources of disturbing sound is based largely on binaural (two-eared) hearing. Patients suffering from hearing loss should thus be provided as far as possible with hearing aids at both ears. For hearing-impaired persons with asymmetrical hearing loss, hearing aids are offered whereby a microphone is attached in the vicinity of one ear, while the other ear is supplied with the signals picked up at the hearing-impaired ear and amplified, in addition to the standard sound. Connections from one ear to the other are required for this purpose. In constructing hearing aids in the form of hearing-aid glasses, leads are routed via the eyeglass frame (German Gebrauchsmuster 76 15 686). For this purpose, however, it is necessary that the leads run via the eyeglass hinge. These bending points are a source of defects, because the leads are bent during use, and/or contacts susceptible to disturbance must be employed. It is, however, burdensome for the hearing-impaired person to have electrical leads running on another path, from one ear over the head to the other ear. In addition, these electrical line connections between the hearing aid of one ear and the hearing aid of the other ear are highly susceptible to interference from electromagnetic fields produced by transistors employed in the hearing aid circuitry.

In order to be able to avoid an electrical connecting line between a microphone on one side of the head and an earphone on the other side of a person with asymmetrical hearing loss, it is known from German PS 23 60 342 to allocate to each ear a hearing aid assembly to be worn at the head; in one assembly the earphone, and in the other assembly the microphone, is replaced by an induction coil. This arrangement, which is very sensitive to disturbance from electromagnetic fields, can be realized through the use of two hearing aid apparatuses to be worn behind the ear, one of which is modified by exchanging the earphone for an induction coil. Another possibility is to use hearing-aid glasses in which a hearing aid is housed in each side piece. In this arrangement as well, on one side the earphone is exchanged for the induction coil, and on the other side the hearing aid is switched over for reception via the induction coil, or is hardwired with the coil instead of with the microphone.

For improving the hearing of hearing-impaired persons having asymmetrical hearing loss, the CROS (Contralateral Routing of Signal) method (the routing of a sound signal from one side of the head over to the other) can be used. To improve intelligibility when the hearing-impaired person is addressed from the side at which hearing is particularly impaired, the sound is thus picked up by the microphone of the hearing aid at the deaf ear and is supplied to the ear with good hearing, which remains open, at the other side of the head. In this way, the portion of the high frequencies that is attenuated due to the sonic effect of the head can be supplied to the ear with good hearing, and this portion is superimposed on the sound that the ear receives immediately from the sound field due to the open auditory passage. In this way, a unilaterally deaf person can, for example, better understand his or her neighbor sitting on his or her deaf side during round-table discussions.

In general, the CROS method is primarily recommended for those hearing-impaired persons whose hearing loss is limited to the upper speech frequency region. In supplying such a person with a hearing aid, the sound attenuation effect of the head is then used to acoustically separate the microphone and the earphone from one another. The amplification of the hearing aid at high frequencies can then be set higher than usual without the disturbance of acoustic feedback. In place of a snugly seated fitting earpiece, the auditory passage can remain outwardly open. The sound that the earphone produces is supplied to this auditory passage via an acoustic line.

In addition, the BICROS method is known for persons with asymmetrical hearing loss who also have a relatively great amount of hearing loss in the better ear. Here two microphones are used, located in the vicinity of each ear inlet, and connected to a single amplifier. The earphone emits the sound to the auditory passage of the better-hearing ear, connected to the fitting earpiece. The hearing aid suited for the BICROS method is also provided with a selector switch, by means of which either the microphones can be connected to the input of the amplifier together, or each can be connected to this input in itself. In this way, the hearing-impaired person can not only exploit the BICROS method but also can switch the hearing aid like a normal hearing aid, if he or she places the microphone located at the worse-hearing side out of operation.

Finally, signal processing systems are known for binaural hearing aids ("Psychoacoustics, Speech and Hearing Aids," B. Kollmeier, Verlag World Scientific 1995, page 246), to which the sound signals or characteristics obtained therefrom are supplied from hearing aid apparatuses worn at the right and left ear. In these systems, by means of comparison, correlation, etc., parameters are calculated that then influence the further signal processing in one or the other hearing aid apparatus, or in both of them. The suppression of disturbing noise from particular spatial directions can thereby be improved, e.g. by means of automatic adaptation of filter banks to the current disturbing sound scenario, or reverberation (echoes) can be reduced. These systems require bidirectional communication between the hearing aids worn at both sides of the head.

SUMMARY OF THE INVENTION

An object of the present invention is to further improve a hearing aid of the type named above.

According to the invention, this is achieved in a hearing aid having two hearing apparatuses worn at opposite sides of the head, wherein at least one of the hearing apparatuses has a transmitter, and at least one other of the hearing apparatuses has a receiver for an optical signal transmission from one of the hearing apparatuses to the other.

The invention has the advantage that there is no electrical line connection between the two hearing apparatuses of the hearing aid worn at the head, and that the optical signal transmission is not sensitive to disturbances from electromagnetic disturbing fields i.e. it is (EMI-protected). In the construction of the hearing aid in the form of hearing-aid glasses, it is advantageous that no fixed connections are required between the eyeglass frame and the hearing apparatuses. The transmission of information from the transmitter of one hearing apparatus to the receiver of another of the hearing apparatuses at the other side of the head can ensue in analog or digitally encoded form, whereby a high data rate is possible.

In an embodiment, in the hearing aid according to the invention the transmission of information takes place by means of infrared light. The transmitting hearing apparatus comprises an IR transmission unit, e.g. an IR diode, while the receiving hearing aid is equipped with an IR receiver, e.g. an IR transistor or a photocell or an Si receiver diode.

For a bidirectional signal transmission, a transmitter and receiver can be provided in each hearing apparatus.

In order to support signal transmission, in the construction of the hearing aid as hearing-aid glasses a light waveguide can be provided that connects the transmitter and receiver devices of the hearing apparatuses and that is routed in the side pieces of the glasses and via the center part of the glasses.

The hearing aid according to the invention is suited for hearing aids for binaural hearing according to the CROS or BICROS method. The feedbacks between the sound transducers that occur at higher amplifications can thereby be avoided. Moreover, directional hearing is further improved, e.g. through the use of directional microphones.

For bidirectional communication between the hearing apparatuses respectively worn at the right ear and at the left ear, according to the invention the sound signals picked up by the microphones of the hearing apparatuses, or control signals derived therefrom, can be transmitted via the optical signal transmission for bidirectional communication between the hearing apparatuses.

DESCRIPTION OF THE DRAWINGS

The drawing schematically shows a hearing aid according to the invention, in an exemplary embodiment as hearing-aid glasses.

DESCRIPTION OF THE PREFERRED EMBODIMENTS

The hearing aid 1 worn at the head shown in the drawing is fashioned as hearing-aid glasses 7 for binaural hearing. The hearing-aid glasses 7 have a center piece 10 to which the side bows 8 and 9 are laterally coupled. In the region of the ends of the side pieces and in the vicinity of the ears, the hearing-aid glasses 7 according to the exemplary embodiment carry hearing apparatuses 2 and 3. The hearing apparatuses 2 and 3 can be either placed on the side bows 8 and 9, or the components of the hearing apparatuses 2 and 3 can be housed in the side bows 8 and 9, constructed with a slightly enlarged shape.

In the CROS embodiment, it is sufficient if one of the hearing apparatuses contains one microphone and the sound signals emitted from this microphone are transmitted to the other hearing apparatus, which contains at least one amplifier and an earphone, whose sound signals are supplied to the ear that is allocated to the receiving hearing apparatus.

In the BICROS embodiment, each of the hearing apparatuses 2 and 3 has a separate microphone, with the sound signals of the apparatus allocated to the more greatly impaired ear can be transmitted to the signal processing circuit of the other apparatus, which is allocated to the ear with better hearing.

According to the invention, at least one of the hearing apparatuses 2 and 3 has a transmitter, and the other hearing apparatus has a receiver, for optical signal transmission 4 from the transmitting hearing apparatus to the receiving hearing apparatus.

According to the exemplary embodiment, an infrared transmitter 5 and an infrared receiver 6 are provided in each of the hearing apparatuses 2 and 3 for a bidirectional signal transmission.

In an embodiment it is possible, in hearing-aid glasses in particular, to provide a light waveguide 4 that connects the transmitter 5 and the receiver 6 of the hearing apparatuses, the waveguide being routed in the side pieces 8 and 9 and via the center part 10.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A hearing aid comprising:

first and second hearing apparatuses each containing hearing-improving circuitry, and each having an acoustic output port;

an eyeglasses frame having two side bows joined by respective hinges to a center frame part, said first and second hearing apparatuses being respectively disposed at said side bows at opposite sides of head of a hearing-impaired person, with said output ports being adapted to be conducted into respective ear canals of said hearing-impaired person;

said first hearing apparatus including an optical emitter for emitting optical signals and said second hearing apparatus including an optical receiver for receiving said optical signals; and an optical waveguide contained in said eyeglasses frame and extending along said side bows and said center frame part, between said first and second hearing apparatuses so that said optical receiver of said second hearing apparatus receives said optical signals emitted by said optical signal emitter of said first hearing apparatus via said optical waveguide.

2. A hearing aid as claimed in claim 1 wherein said optical emitter comprises an emitter which emits visible light, and wherein said optical receiver comprises a receiver which receives said visible light emitted by said emitter.

3. A hearing aid as claimed in claim 1 wherein said optical emitter comprises a light emitting diode which emits infrared light, and wherein said optical receiver comprises an infrared receiver selected from the group consisting of a photocell, a photodiode and a phototransistor.

4. A hearing aid as claimed in claim 1 wherein said second hearing apparatus contains a further optical emitter for emitting further optical signals and wherein said first hearing apparatus contains a further optical receiver for receiving said further optical signals emitted by said further optical emitter, and wherein said optical waveguide comprises a bi-directional optical waveguide.

5. A hearing aid as claimed in claim 1 wherein said optical emitter comprises an analog optical signal emitter which emits analog optical signals and wherein said optical receiver comprises an analog optical signal receiver which receives said analog optical signals emitted by said analog optical signal emitter, and wherein said optical waveguide is insensitive to electromagnetic disturbing fields.

6. A hearing aid as claimed in claim 1 wherein said optical emitter comprises an digital optical signal emitter which emits digital optical signals and wherein said optical receiver comprises an digital optical signal receiver which receives said digital optical signals emitted by said digital optical signal emitter, and wherein said optical waveguide is insensitive to electromagnetic disturbing fields.

7. A hearing aid as claimed in claim 1 wherein said optical emitter comprises means for emitting optical control signals, and wherein said optical receiver comprises means for receiving said optical control signals.

8. A hearing aid as claimed in claim 7 wherein said hearing-improving circuitry in said first hearing apparatus includes means for converting incoming audio signals containing audio information into optical audio information signals containing said audio information and wherein said optical signal emitter comprises means for emitting said optical audio information signals together with said optical control signals and wherein said optical receiver comprises means for receiving said optical audio information signals together with said optical control signals.

9. A hearing aid as claimed in claim 1 wherein said optical waveguide is continuous between said first and second hearing apparatuses.

* * * * *